(12) United States Patent
Ju

(10) Patent No.: US 6,831,969 B2
(45) Date of Patent: Dec. 14, 2004

(54) CALLER ID DISPLAY SYSTEM FOR TELEPHONY OVER A PACKET SWITCHED NETWORK

(75) Inventor: Paul Pay-Lun Ju, Cupertino, CA (US)

(73) Assignee: Innomedia Pre Ltd., Singapore (SG)

( * ) Notice: Subject to any disclaimer, the term of this patent is extended or adjusted under 35 U.S.C. 154(b) by 277 days.

(21) Appl. No.: 10/115,807

(22) Filed: Apr. 4, 2002

(65) Prior Publication Data

US 2003/0190024 A1 Oct. 9, 2003

(51) Int. Cl.[7] .................. H04M 1/56; H04M 15/06; H04M 11/00
(52) U.S. Cl. ............. 379/142.16; 379/142.01; 379/142.17; 379/93.23; 370/352; 725/106
(58) Field of Search .............. 379/142.01, 142.04, 379/142.07, 142.14, 142.15, 142.16, 142.17, 90.01, 93.17, 93.23, 100.12, 100.13, 102.02, 102.03; 370/352, 355, 356; 725/106

(56) References Cited

U.S. PATENT DOCUMENTS

| | | | | |
|---|---|---|---|---|
| 5,696,815 A | * | 12/1997 | Smyk | 379/142.16 |
| 5,724,412 A | * | 3/1998 | Srinivasan | 379/93.23 |
| 5,790,174 A | * | 8/1998 | Richard et al. | 725/99 |
| 5,937,038 A | * | 8/1999 | Bell et al. | 379/93.17 |
| 5,999,612 A | * | 12/1999 | Dunn et al. | 379/212.01 |
| 6,052,444 A | * | 4/2000 | Ferry et al. | 379/93.35 |
| 6,209,025 B1 | * | 3/2001 | Bellamy | 709/217 |
| 6,292,479 B1 | * | 9/2001 | Bartholomew et al. | 370/352 |
| 6,535,590 B2 | * | 3/2003 | Tidwell et al. | 379/110.01 |
| 6,546,092 B2 | * | 4/2003 | Corbett et al. | 379/93.35 |
| 6,633,635 B2 | * | 10/2003 | Kung et al. | 379/215.01 |
| 6,687,245 B2 | * | 2/2004 | Fangman et al. | 370/356 |

FOREIGN PATENT DOCUMENTS

WO WO 9619066 A1 * 6/1996 ............ H04M/1/56

* cited by examiner

Primary Examiner—Quoc Tran
(74) Attorney, Agent, or Firm—Timothy P. O'Hagan

(57) ABSTRACT

The present invention relates to displaying caller ID information, and more specifically, to displaying caller ID information in an environment with broadband telephony service. The invention provides a method and apparatus for receiving caller ID information from a service provider and providing the caller ID information for display as an overlay over a television programming image provided by the service provider and displayed on a television.

10 Claims, 2 Drawing Sheets

CALLER ID DISPLAY SYSTEM FOR TELEPHONY OVER A PACKET SWITCHED NETWORK

TECHNICAL FIELD

The present invention relates to displaying caller ID information, and more specifically, to displaying caller ID information in an environment with broadband telephony service.

BACKGROUND OF THE INVENTION

For many years voice telephone service was implemented over a circuit switched network commonly known as the public switched telephone network (PSTN) and controlled by a local telephone service provider. In such systems, the analog electrical signals representing the conversation are transmitted between the two telephone handsets on a dedicated twisted-pair-copper-wire circuit. More specifically, each telephone (i.e. one at the end placing the call and the other to the end receiving the call) is coupled to its respective local switching station on a dedicated pair of copper wires known as a subscriber loop. When a telephone call is placed, the circuit is completed by dynamically coupling each subscriber loop through its local switching station to a dedicated pair of copper wires between the two local switching stations. Once it is placed, the call causes a signaling, universally known as "ringing", in the receiving telephone. As will be discussed below, the signal causing the ringing may also convey certain information. Once the call is answered, the circuit is completed between the calling phone and the receiving phone. This is a classic circuit-switched network. A main advantage of it the circuit is connected and continually capable of carrying information (in this case, a voice audio signal) for as long as the call duration is in progress. A disadvantage is that this is wasteful, inasmuch as resources are constantly used for as long as the circuit is complete, whether or not information is being transmitted (e.g. during periods of silence).

Although over a century old, the PSTN has proven amenable to upgrades and adding new functionality to the extant PSTN. Recently, "caller ID" functionality has been added to PSTN systems. Caller ID, as is well-known, provides means for the recipient of a call to know who is placing that call, without actually answering the call. The PSTN service provider may, for example, provide Caller ID information to the recipient of a call by including frequency shift key (FSK) modulated signals after the second ring signal that includes Caller ID information such as the caller telephone number and the name of the person to which the caller telephone number is assigned.

At the called station, the FSK signals can be decoded by a Caller ID circuit and displayed to the callee. The Caller ID circuit has been embodied in a stand alone unit which would be coupled to the PSTN line between the callee's telephone and the local switching station, ordinarily at a point proximate to the caller's telephone. The stand alone Caller ID unit would include the Caller ID circuit and a means for conveying the Caller ID information, the means being most typically a small screen such an LCD screen.

In an alternative to the stand-alone Caller ID unit, the Caller ID circuit has also been incorporated directly into in a PSTN telephone. In this embodiment, the telephone itself includes the Caller ID circuit and a display screen for displaying the Caller ID information.

In yet another alternative device of the prior art, a stand alone box provides for displaying the Caller ID information on a television. The stand alone box is also coupled to the PSTN line and is simultaneously coupled to the cable line that provides a video signal to the television. Such a unit includes the above-described PSTN Caller ID circuit for decoding the FSK signals and also includes an image overlay circuit for putting a signal representing a text representation of the Caller ID information into the video signal such that the resultant video signal provided to the television includes the text Caller ID information overlaid over the image contained in the original video signal.

The aforementioned equipment has served satisfactorily in the past, in which the television and telephone signals were separately supplied, i.e., the television signals were supplied via coaxial cable, and the telephone signals were supplied via the twisted-pair copper long common to the PSTN network. This arrangement seemed to work well, because voice communications were thought to best benefit from a circuit-switched network, while data communications were thought to best benefit from a packet-switched network. However, advances in packet switched network bandwidth (e.g. advances in data transmission) have made it possible for telephone conversations to be communicated using a packet-switched architecture over networks such as a Hybrid Fiber Cable (HFC) network (or a pure coaxial cable network) that also communicates television programming and Internet traffic along with telephony communications. Thus, new technology has emerged in which the television and telephone signals are jointly supplied via a single broadband line, e.g. coaxial cable. This single broadband line will carry television programming and Internet traffic along with telephony signals. When voice telephony is provided in this manner it is no longer being provided by a circuit-switched network but rather by a packet-switched network. Such packet-switched network equipment is designed to interoperate with classic telephone equipment, by including a customer gateway through which a standard telephone may be connected. The customer gateway will perform functions comprising digital-to-analog conversion, and will digitally generate and output to the telephone a an analog signal signal which is equivalent to that provided by the PSTN; as such, a "virtual PSTN" is provided to the standard telephone equipment. Given the comparative abundance of bandwidth available, most customer gateways will provide a plurality of separate telephone numbers, and will provide separate outputs for each.

In order for Caller ID equipment which is made for use with the circuit-switched network to work with the Virtual PSTN, the customer gateway must replicate the FSK signal on the line corresponding to each telephone number, and each line must be provided with its own Caller ID display. This becomes cumbersome and expensive, particularly when several telephone numbers are provided as standard outputs, as each standard output requires its own unique twisted line pair emerging from the customer gateway (most commonly, each emerges through an RJ-11 modular connection). Even more than cumbersome and expensive, it becomes virtually impossible when the lines are provided as IP telephony lines, as such have no ability to provide Caller ID Data for display using standard Caller ID Data which coupled to the IP telephony lines.

What is needed is a Caller ID display system that provides for a more convenient display of Caller ID information in a system wherein telephone service is provided over a broadband network.

SUMMARY OF THE INVENTION

A first aspect of the present invention is to provide a method and apparatus for display of Caller ID information in a system wherein telephone service is provided over a broadband network. The broadband network may be a packet switched coaxial cable network or a hybrid fiber/cable network. The broadband network may provide to the apparatus both television programming and telephone communication services. The apparatus may have as its input a single coaxial cable connector for coupling to the broadband network.

The apparatus may have as its output both a telephone output means and a video signal output means. The telephone output means may comprise at least one of a plurality of means for providing a telephony signal of at least one type of telephone device. The telephony signal may be a voice-over-IP signal compatible with an IP telephony telephone device or may be an analog or PSTN digital telephony signal compatible with a standard telephone. The video signal output means may comprise circuits for providing an analog or digital video signal for providing an image on a video device such as a television.

The image may include the television programming provided on the broad band network along with a representation of caller ID data associated with a telephone call to one of the telephone devices supported by the apparatus. The caller ID data may include data representing the caller and line information representing to which one of the telephone devices the call was placed.

This indication, in simple terms, indicates to the callee on which line the call is coming in. In each case, the image is overlaid on the picture of a television which the callee may be watching, thus easily informing him or her of details about the incoming call.

A second aspect of the present invention is to provide a customer gateway for communicating with a service provider network. The service provider network provides television programming for display on a video device and telephony communications for supporting at least one telephone device. The customer gateway comprises a service provider network interface circuit for receiving frames from the service provider network. The frames comprise television programming frames and telephony frames. The telephony frames include caller ID data. The customer gateway further comprises a telephony processing circuit that includes means for translating telephony frames to telephone signals compliant with the at least one telephone device and means for providing the caller ID data to a television circuit. The television circuit comprises means for receiving the television programming frames and generating a television programming signal compliant with a receiver associated with the video device and means for receiving and overlaying the caller ID data on a portion of a video image represented by the television programming signal.

The means for translating telephony frames to telephone signals may comprise a PSTN circuit for generating a PSTN compliant telephone signal to each of a plurality of PSTN ports or may comprise a voice-over-IP circuit for maintaining a real-time communication channel with each of the at least one telephone device through a network port.

The means for providing the caller ID data comprises means for providing an identification of the at least one telephone device to which the call is placed and the means for receiving and overlaying the caller ID data on a portion of the video image comprises means for receiving and overlaying the caller ID data and the identification of the at least one telephone device on the video image.

A third aspect of the present invention is to provide an image overlay circuit for coupling between a video display device and a frame switched network from which a frame of data representing caller ID information and video programming may be received. The image overlay circuit comprises a network interface for coupling to the frame switched network and for receiving the frame of data representing caller ID information and a frame of data representing the video programming and a video signal generating circuit for generating a video signal for display on the video display device. The video signal comprises an overlay of a pixel graphic representing the Caller ID information on the video programming. The frame of data representing the caller ID information further includes an identification of with which of a plurality of telephone devices the caller ID information is associated and the video signal generating circuit further provides for the video signal comprising an overlay of a pixel graphic representing the identification on the video programming.

A fourth aspect of the present invention is to provide a method of processing caller ID data. A step comprises receiving frames from a service provider, the frames comprising television programming frames and telephony frames. The telephony frames including caller ID data. Other steps comprise translating telephony frames to telephone signals compliant with the at least one telephone device, translating the caller ID data to an image representing the caller ID data, translating the television programming frames to a television programming signal representing a television image for display on an associated video device, and combining the image representing the caller ID data with the television programming signal such that the television image includes the image representing the caller ID data overlaid over a portion of the television image.

The step of translating telephony frames to telephone signals may further comprises translating the telephony frames to telephone PSTN compliant signals and coupling each PSTN compliant signal to one of a plurality of PSTN ports, or, may further comprise translating the telephony frames to frames compatible with a real-time communication channel over a frame switched network with each of a plurality of frame-switched telephone devices coupled thereto.

The step of combining the image representing the caller ID data with the television programming signal may further comprises combining an image of information representing with which of the plurality of PSTN ports or frame-switched telephone devices the caller ID is associated.

A fifth aspect of the present invention is also to provide a method of processing caller ID data. The method of this fifth aspect comprises receiving a frame of data representing video programming from a frame switched network, receiving a frame of data representing caller ID information from the frame switched network, and generating a video signal for display on a video display device. The video signal comprises an overlay of a pixel graphic representing the Caller ID information on an image represented by the video programming.

The method may further comprises receiving a frame of data representing an identification of with which of a plurality of telephone devices the caller ID information is associated and the signal may further comprises an overlay of the identification on the image represented by the video programming.

A sixth aspect of the present invention is to provide a customer gateway for communicating with a service provider network. The service provider network provides telephony communications for supporting at least one telephone device, The customer gateway comprises a service provider network interface circuit for receiving frames from the service provider network. The frames include caller ID information and include real time streaming media. The gateway further comprises a telephony processing circuit that includes means for sending a frame representing the real time streaming media to a network telephone device at a first network address and means for sending a frame representing the caller ID information to a caller ID device at a second network address.

The telephony processing circuit may further include means for sending a frame representing the caller ID information to the network telephone device at the first network address, means for identifying with which one of a plurality of virtual subscriber loops the caller ID information is associated, and means for sending an indication of such identification to the second network address.

For a better understanding of the present invention, together with other and further aspects thereof, reference is made to the following description, taken in conjunction with the accompanying drawings, and its scope will be pointed out in the appended claims.

Figure 1:
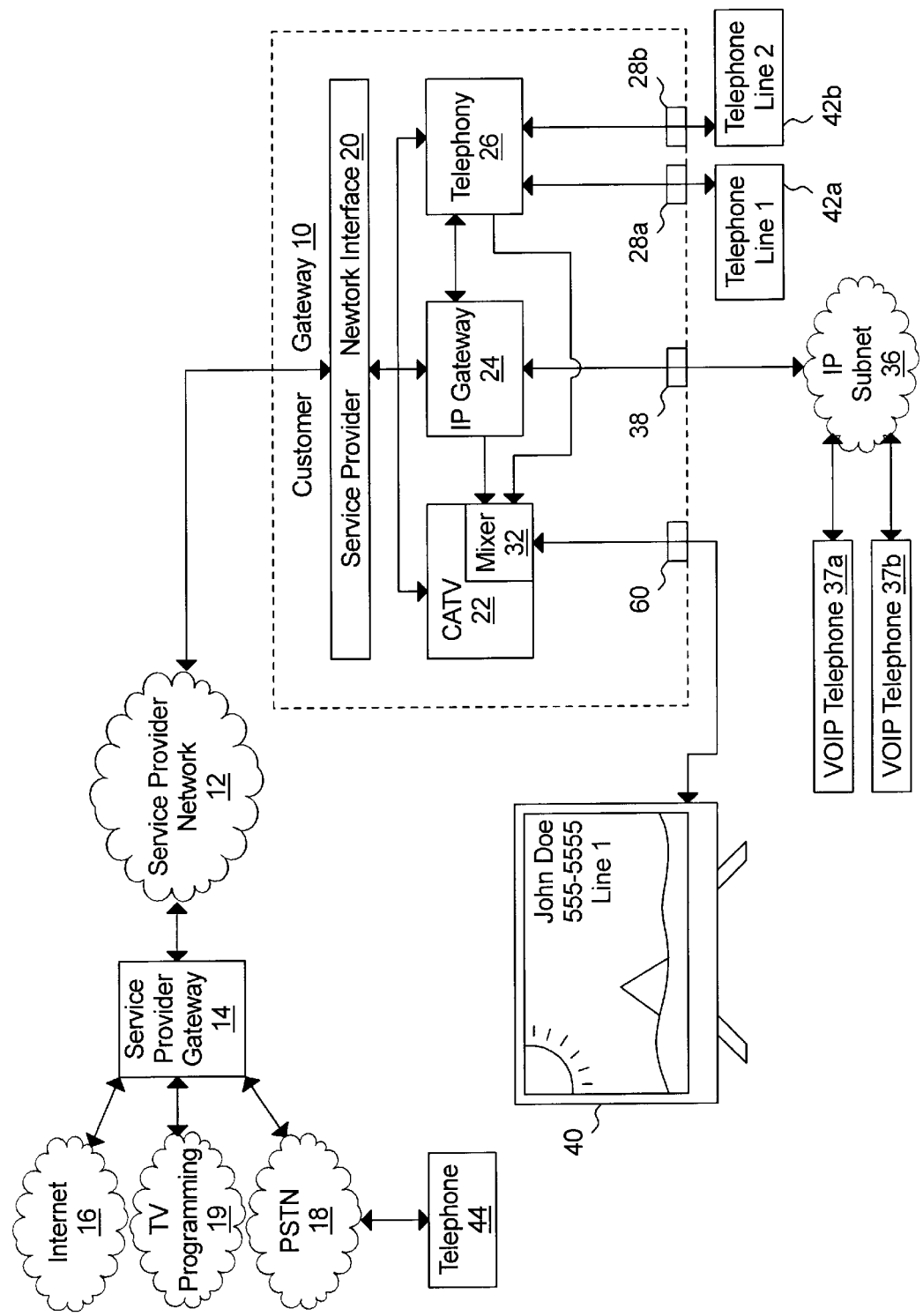
FIG. 1 is a block diagram of a real time media communication network in accordance with one embodiment of this invention.

DETAILED DESCRIPTION OF THE
EXEMPLARY EMBODIMENTS

The present invention will now be described in detail with reference to the drawing. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code, or a combination of a hardware circuit(s) and a processor or control block of an integrated circuit executing machine readable code. As such, the term circuit, module, server, or other equivalent description of an element as used throughout this specification is intended to encompass a hardware circuit (whether discrete elements or an integrated circuit block), a processor or control block executing code, or a combination of a hardware circuit(s) and a processor and/or control block executing code.

Referring now to FIG. 1, a packet switched service provider network 12 interconnects a service provider gateway 14 with a customer gateway 10. The service provider gateway may be coupled to the Internet 16, the public switched telephone network 18, and a television programming provider 19. As such, the service provider gateway 14 may provide Internet connection services, telephone communication services, and digital cable television programming to a customer gateway 10 over the service provider network 12.

In the exemplary embodiment, the service provider network 12 may be a hybrid fiber/cable (HFC) network over which data may be exchanged between the service provider gateway 14 and the customer gateway 10 utilizing a predetermined protocol. An exemplary protocol would include one of the versions of the Data Over Cable Service Interface Specification (DOCSIS) published by Cable Television Laboratories, Inc. 400 Centennial Parkway, Louisville, Colo. 80027-1266, USA.

The predetermined protocol utilized for communications between the service provider gateway 14 and the customer gateway 10 supports higher level protocols for providing the Internet connection service, telephone service, and digital cable television programming.

For providing Internet connection service, the network protocol may support the Internet Protocol (IP) suite such that the customer gateway 10 may communicate with other IP compliant devices coupled to the Internet 16.

For providing virtual subscriber loop telephone service (both audio and audio/video), the network protocol may support a real time media protocol such as the PacketCable protocol published by Cable Television Laboratories, Inc. operating over the IP suite to dynamically reserve bandwidth on the service provider network 12 and maintain a real time audio (or audio/video) communication session with an endpoint telephone system 44 on the PSTN 18.

Alternatively, for providing telephone service, the network protocol may support a committed bit rate (CBR) protocol for reserved bandwidth on the service provider network 12 for maintaining a virtual circuit over the service provider network 12 to support real time communication session with an endpoint telephone system 44 on the PSTN.

For providing digital cable television programming, the network protocol may support higher level digital cable television programming protocols such that the customer gateway 10 may selectively receive television programming from the television programming provider 19.

The customer gateway 10 includes a service provider interface 20, a cable TV circuit 22, an IP gateway circuit 24, and a CBR gateway circuit 26. The service provider interface 20 operates the network protocol and manages the communications of the cable TV circuit 22, IP gateway circuit 24, and the CBR gateway circuit 26 over the service provider network 12. More specifically, when receiving data from the service provider gateway 14, the network interface circuit 20 provides the frame to the applicable one of the cable TV circuit 22, the IP gateway circuit 24, and the CBR gateway circuit 26 based on applicable header information in the frame and/or a time slot in which the frame was received. When sending data to the service provider gateway 14, the network interface circuit 20 receives data from the cable TV circuit 22, the IP gateway circuit 24, or the CBR gateway circuit 26, builds a frame (or frames) in compliance with the protocol of the service provider network 12, and transmits such frame(s) to the service provider gateway 14 over the service provider network 12 with applicable header information and/or in applicable time slots.

The IP gateway circuit 24 may operate as a network address translation server (NAT server) communicating frames over the service provider network 12 on behalf of a plurality of IP devices coupled an IP sub-net 36 that is served by the IP gateway circuit 24 through the LAN port 38. The IP devices coupled to the IP sub-net 36 may include computers devices that exchange data with a remote computer device and voice-over-IP (VOIP) telephony devices 37a and 37b that exchange real time streaming media (audio and video) with a remote endpoint utilizing TCP/IP connections and UDP/IP channels. Further, the IP gateway circuit 24 may operate as a gateway with predefined ports available to permit the service provider gateway 14 to send unsolicited frames to each of the VOIP telephony devices 37a and 37b to enable inbound call signaling.

Each of the VOIP devices 37a and 37b may include an audio system with a speaker and microphone for translating an audio conversation to VOIP frames or may include a PSTN conversion circuitry that translates between VOIP frames and analog or digital PSTN signals for supporting a traditional telephone device.

Each of the service provider gateway 14 and the VOIP device 37a, 37b may utilize predefined protocols for signaling a media session, negotiating parameters for establishing a media session, and tearing down a media session. An exemplary protocol includes a protocol known as the Session Initiation Protocol (SIP) developed by the Internet Engineering Task Force (IETF). As part of signaling a media session, caller ID information such as the telephone number of the calling device and the name of a person associated with the telephone number of the calling device may be provided to the callee device. The frames that includes such caller ID information are routed to the callee device 37a, 37b during the signaling of a media session.

The CBR gateway circuit 26 may interface communications between the service provider gateway 14 and each of a plurality of PSTN telephone devices 42a, 42b. The CBR gateway circuit 26 may communicate sequences of real-time media frames that represent one or more telephone (or videophone) conversations with the service provider gateway 14 and may communicate analog (or digital PSTN) signals representing each such conversation on a PSTN port 28a or 28b such that a traditional PSTN telephone device 42a or 42b coupled to the PSTN port 28a or 28b may be used for a telephone conversation with a remote telephone device 44 coupled to the PSTN 18.

Additionally, it is possible that the CBR gateway circuit 26 may interface communications between the service provider gateway 14 and each of a plurality of VOIP telephone devices 37a, 37b in an environment where the service provider network 12 will support CBR protocols for streaming audio but will not support a dynamic quality of service (DQOS) protocol for streaming audio over IP. In such case, a VOIP session would exist between the CBR circuit 26 on the IP subnet 36 and the CBR circuit 26 would translate the streaming audio between VOIP protocols on the IP subnet 36 and CBR protocols on the service provider network 12.

As part of call signaling to the CBR gateway circuit 26, the service provider gateway 14 may provide caller ID information to the CBR gateway 26. The CBR gateway circuit 26 receives frames representing the caller ID data and extracts the caller ID information. If the inbound call is on a virtual subscriber loop that is served by one of the PSTN ports 28a or 28b, the CBR gateway circuit 26 generates applicable analog (or digital PSTN) caller ID signals on such PSTN port 28a or 28b. If the inbound call is to VOIP device 37a or 37b, the CBR gateway circuit 26 generates applicable media session signaling frames for transmission to such VOIP telephone device 37a, 37b on the subnet 36.

Whether an inbound call is a VOIP call signaled by the service provider gateway 14 to a VOIP device 37a or 37b or whether the inbound call is signaled by the service provider gateway 14 to the CBR gateway circuit 26, the caller ID information should be provided to the cable TV 22 such that the cable TV circuit 22 may provide a display of the caller ID information on a television 40. Further, line identification information (e.g. information that identifies which of the virtual subscriber loops 28a, 28b or which of the virtual subscriber loops to a VOIP device 37a, 37b to which the inbound call was placed) would also be provided to the cable TV circuit 22 such that the cable TV circuit 22 may include line identification in the display of the caller ID information on the television 40.

The cable TV circuit 22 receives, sequences, and decompresses frames that include digital cable television programming provided by the service provider gateway 14 and generates an analog or digital television programming signal compliant with a receiver in the television 40. The analog or digital signal is coupled to an output port 60 for coupling to the television 40. To provide for the display of caller ID information and line identification on the television 40, the cable TV circuit further includes a mixing circuit 32 that generates a text representation of the caller ID information and line identification and overlays the text representation over the television programming. For example, the text representation may be a rectangular graphic "window" that replaces (or is written over) television programming in a "window" of equal size to provide for the display of the caller ID information and line identification in a "picture in picture" format. Alternatively, the text representation may have a "transparent background" that can be provided by only overwriting a portion of the television programming that corresponds to the text font with a contrasting font color. In any embodiment, the analog or digital signal coupled to the output port 60 will include the television programming image with the caller ID information and/or line identification visible thereon.

Figure 2:
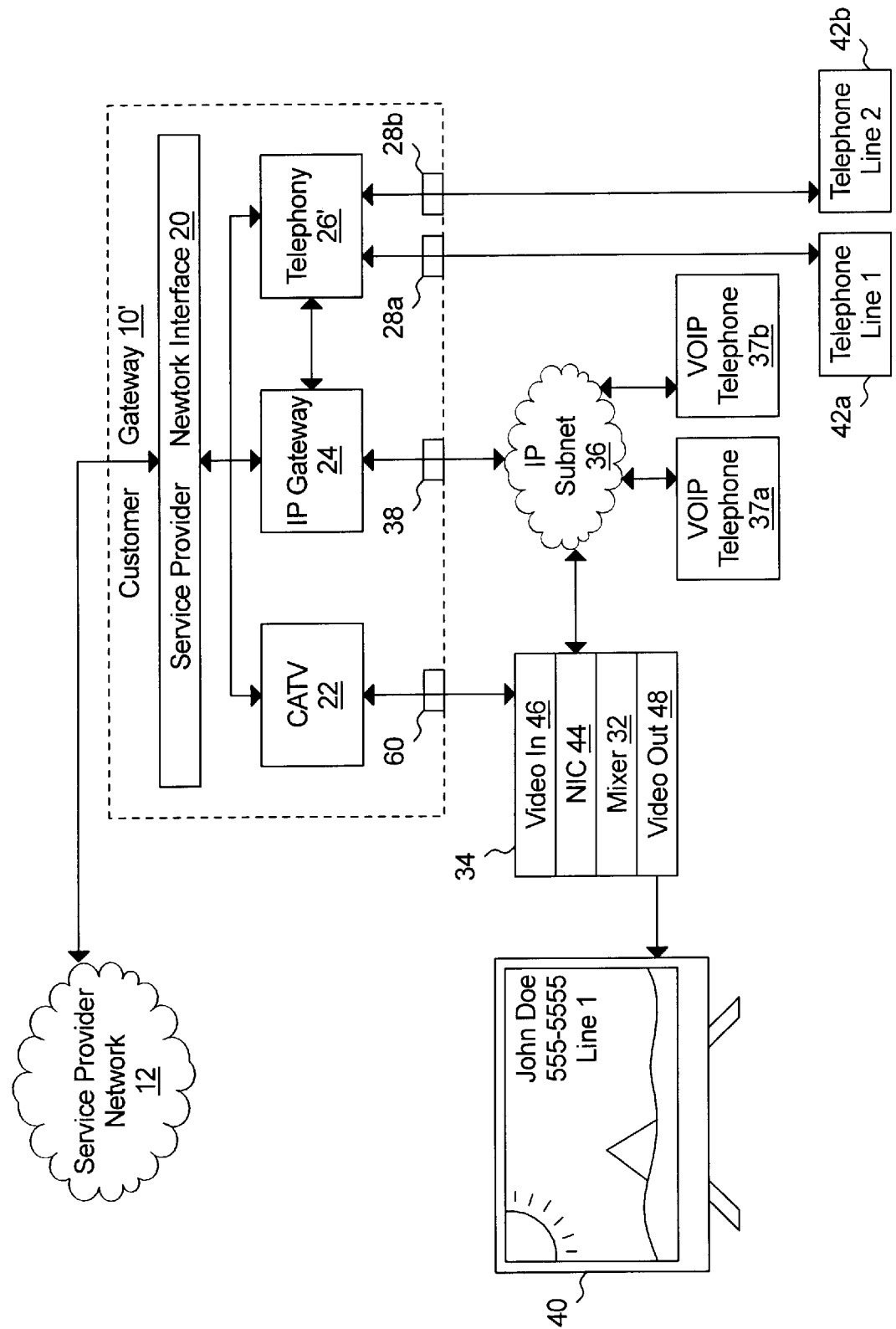
FIG. 2 is a block diagram of a real time media communication network in accordance with another embodiment of this invention.

Referring to FIG. 2, an alternative embodiment of the present invention is shown to include a customer gateway 10' and a stand alone stand alone mixer unit 34. The customer gateway 10' is similar in structure to the customer gateway 10. However, the telephone gateway 26' of customer gateway 10' provides the caller ID information and line identification to the stand alone mixer unit 34 for display on the television 40 by generating TCP/IP or UDP/IP frames and routing such frames to the stand alone mixer unit 34 through the IP gateway 24 and the IP subnet 36.

The CBR gateway circuit 26' may receive frames representing caller ID information for inbound calls on a virtual subscriber loop from the service provider gateway 14. The CBR gateway circuit 26' extracts the caller ID information and generates applicable analog (or digital PSTN) caller ID signals on such PSTN port 28a or 28b if the inbound call is on a virtual subscriber loop associated with one of such ports 28a or 28b. And, if the inbound call is on a virtual subscriber loop that is served by one of the VOIP devices 37a or 37b, the CBR gateway circuit 26' generates applicable VOIP frames representing the caller ID information for transmission to the applicable VOIP telephone device 37a, 37b through the IP gateway 24 and on the subnet 36.

As discussed with respect to FIG. 1, each of the VOIP telephone devices 37a and 37b may receive inbound call signaling directly from the service provider gateway 14 through the IP gateway 24. Such call signaling frames may include caller ID information and the destination address of the header would identify to which of the VOIP telephone devices 37a and 37b the call signaling frame should be routed (e.g. line identification). In one embodiment, each of the VOIP telephone devices 37a and 37b may include applicable circuits for sending the caller ID information (along with line identification) as payload in a frame to the stand alone mixer unit 14 over the IP subnet 36. In another embodiment, the stand alone mixer unit 14 may include circuits for recognizing the IP address of each of VOIP telephone devices 37a and 37b and receiving (e.g. listening in on) the call signaling frames provided to such VOIP telephone devices 37a and 37b to obtain the caller ID information as payload in each frame and line identification by extracting the IP header destination address.

However, it should be appreciated that based on the topology of the IP subnet 36, it is possible that a frame addressed to a VOIP telephone device 37a or 37b may not be transmitted on a portion of the network to which the stand alone mixer unit 34 is coupled. As such, addressing frames directly to the stand alone mixer unit 34 is preferable. It should be appreciated that the caller ID information and the line identification may be provided as payload data in a single frame or in multiple frames. As such, the discussion herein referring to "a frame representing caller ID information" and "a frame representing line identification" is intended to encompass both the caller ID information and the line identification in the same frame or in separate frames.

The stand alone mixer unit 34 includes a video input circuit 46, a network interface circuit 44, a mixing circuit 32', and a video output circuit 48. The video input circuit 46 includes circuitry for receiving the analog or digital television programming signal from the customer gateway 10' and presenting it to the mixing circuit 32'.

The network interface circuit 44 includes appropriate circuitry for coupling to the IP subnet 36 and receiving the frame(s) that include the caller ID information and line identification and presenting the caller ID information and line identification to the mixing circuit 32'.

The mixing circuit 32' generates a text representation of the caller ID information and line identification and overlays the text representation over the television programming provided by the video input circuit 46 and provides the resultant television programming signal that includes the overlaid caller ID information and line identification to the video output circuit 48. The video output circuit 48 generates an analog or digital television programming signal that is compliant with the receiver of the television 40 (e.g. the same format as the television programming signal provided to the video input circuit 46 by the customer gateway 10').

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A customer gateway for communicating with a service provider network, the service provider network providing television programming for display on a video device and telephony communications for supporting at least one telephone device, the customer gateway comprising:
  a service provider network interface circuit for receiving IP frames from the service provider network, the frames comprising both television programming frames and telephony frames, the telephony frames including both VoIP media session frames and signaling frames comprising caller ID data;
  a telephony processing circuit including:
    means for translating the VoIP media session frames to telephone signals compliant with the at least one telephone device; and
    means for providing the caller ID data to a television circuit; and
  the television circuit comprising:
    means for receiving the television programming frames from the network interface circuit and generating a television programming signal compliant with a receiver associated with the video device; and
    means for receiving the caller ID data from the telephony processing circuit and overlaying the caller ID data on a portion of a video image represented by the television programming signal.

2. The customer gateway circuit of claim 1, wherein the means for translating the VoIP media session frames to telephone signals comprises a PSTN circuit for generating a PSTN compliant telephone signal to each of a plurality of PSTN ports.

3. The customer gateway circuit of claim 2, wherein:

the means for providing the caller ID data comprises means for providing an identification of the at least one telephone device; and the means for receiving and overlaying the caller ID data on a portion of the video image comprises means for receiving and overlaying the caller ID data and the identification of the at least one telephone device on the video image.

4. The customer gateway circuit of claim 1, wherein the means for translating VoIP media session frames to telephone signals comprises a voice-over-IP circuit for maintaining a real-time communication channel with each of the at least one telephone device through a network port.

5. The customer gateway circuit of claim 4, wherein:

the means for providing the caller ID data comprises means for providing an identification of the at least one telephone device; and the means for receiving and overlaying the caller ID data on a portion of the video image comprises means for receiving and overlaying the caller ID data and the identification of the at least one telephone device on the video image.

6. A method of processing caller ID data, comprising the steps of:

receiving frames from an IP service provider network, the IP frames comprising both television programming frames and telephony frames, the telephony frames including both VoIP media session frames and signaling frames comprising caller ID data;

translating VoIP media session frames to telephone signals compliant with the at least one telephone device; and translating the caller ID data to an image representing the caller ID data;

translating the television programming frames to a television programming signal representing a television image for display on an associated video device; and combining the image representing the caller ID data with the television programming signal such that the television image includes the image representing the caller ID data overlaid over a portion of the television image.

7. The method of claim 6, wherein the step of translating VoIP media session frames to telephone signals further comprises translating the VoIP media session frames to telephone PSTN compliant signals and coupling each PSTN compliant signal to one of a plurality of PSTN ports.

8. The method of claim 7, wherein the step of combining the image representing the caller ID data with the television programming signal further comprises combining an image of information representing with which of the plurality of PSTN ports the caller ID is associated.

9. The method of claim 6, wherein the step of translating VoIP media session frames to telephone signals further comprises translating the VoIP media session frames to frames compatible with a real-time communication channel over a frame switched network with each of a plurality of frame-switched telephone devices coupled thereto.

10. The method of claim 9, wherein the step of combining the image representing the caller ID data with the television programming signal further comprises combining an image of information representing with which of the plurality of frame-switched telephone devices caller ID is associated.

* * * * *